US012600640B2

(12) United States Patent
Kalo et al.

(10) Patent No.: US 12,600,640 B2
(45) Date of Patent: *Apr. 14, 2026

(54) SHEET SILICATE LAMELLAE WITH A HIGH ASPECT RATIO

(71) Applicant: BYK-Chemie GmbH, Wesel (DE)

(72) Inventors: Hussein Kalo, Wesel (DE); Josef Breu, Bayreuth (DE); Matthias Stoeter, Nuremberg (DE); Matthias Daab, Bayreuth (DE)

(73) Assignee: BYK-Chemie GmbH, Wesel (DE)

( * ) Notice: Subject to any disclaimer, the term of this patent is extended or adjusted under 35 U.S.C. 154(b) by 894 days.

This patent is subject to a terminal disclaimer.

(21) Appl. No.: 17/677,438

(22) Filed: Feb. 22, 2022

(65) Prior Publication Data

US 2022/0185684 A1      Jun. 16, 2022

Related U.S. Application Data

(63) Continuation of application No. 16/482,328, filed as application No. PCT/EP2018/052255 on Jan. 30, 2018, now Pat. No. 11,358,874.

(30) Foreign Application Priority Data

Feb. 1, 2017    (EP) .................................... 17154175

(51) Int. Cl.
| | |
|---|---|
| *C01B 33/44* | (2006.01) |
| *C08K 3/34* | (2006.01) |
| *C09K 21/02* | (2006.01) |

(52) U.S. Cl.
CPC ................ *C01B 33/44* (2013.01); *C08K 3/34* (2013.01); *C09K 21/02* (2013.01);
(Continued)

(58) Field of Classification Search
CPC ..... C01B 33/40; C01B 33/44; C01P 2002/20; C01P 2004/20; C01P 2004/24;
(Continued)

(56) References Cited

U.S. PATENT DOCUMENTS 5,326,500 A * 7/1994 Friedman .............. C04B 14/208
423/328.1
7,959,886 B2 * 6/2011 Yamada .................. C01B 33/44
423/328.1
(Continued)

FOREIGN PATENT DOCUMENTS

GB        1593382 A  *  7/1981   ............... B28B 1/00
JP     2004059725 A  *  2/2004   ............... B28B 1/00

OTHER PUBLICATIONS

Khalid et al. RubberNanoclayComposites, Aug. 2016 (Year: 2016).*
(Continued)

*Primary Examiner* — Sally A Merkling
*Assistant Examiner* — Jordan W Taylor
(74) *Attorney, Agent, or Firm* — Fitch, Even, Tabin & Flannery LLP

(57) ABSTRACT

The present invention relates to sheet silicate lamellae of a 2:1 sheet silicate with a high aspect ratio, to a method for producing these sheet silicate lamellae and to an aqueous dispersion which comprises the sheet silicate lamellae. The present invention further relates to the use of the sheet silicate lamellae of the invention for producing a composite material, and also to a corresponding composite material comprising or obtainable using the sheet silicate lamellae, more particularly for use as a diffusion barrier or as a flame retardant.

10 Claims, 3 Drawing Sheets

(52) U.S. Cl.
CPC ...... *C01P 2002/20* (2013.01); *C01P 2004/24* (2013.01); *C01P 2004/54* (2013.01); *C08K 2003/343* (2013.01); *C08K 2201/008* (2013.01); *C08K 2201/016* (2013.01)

(58) Field of Classification Search
CPC .............. C01P 2004/54; C04B 14/208; C08K 2003/343; C08K 2201/008; C08K 2201/016; C08K 3/34; C09D 7/61; C09K 21/02
See application file for complete search history.

(56)                References Cited

U.S. PATENT DOCUMENTS 8,420,040 B2 *    4/2013    Tamura ...................... C09C 1/42
                                                                            524/449

2013/0035432 A1 *    2/2013    Breu ....................... C01B 33/38
                                                                            252/182.33

OTHER PUBLICATIONS

Stoter et al. Langmuir 2013, 29, 1280-1285 Supporting Information (Year: 2013).*
Stoter et al. Langmuir 2013, 29, 1280-1285 (Year: 2013).*
Stoter et al. Angew. Chem. Int. Ed. 2016, 55, 7398-7402 (Year: 2016).*
Kunz et al. ACS Nano, 2013, 7, 5, 4275-4280 (Year: 2013).*
ISO 13320_2009—Particle size analysis—Laser diffraction methods (Year: 2009).*
Miyamoto et al. JP2004059725A English (Year: 2004).*
Kalo, Dissertation, 2012 (Year: 2012).*
Kalo et al., "How to Maximize the Aspect Ratio of Clay Nanoparticles," Nanoscale 2012, 4, 5633 (Mar. 9, 2012).

* cited by examiner

SHEET SILICATE LAMELLAE WITH A HIGH ASPECT RATIO

CROSS REFERENCE TO RELATED APPLICATIONS

This application is a continuation of application Ser. No. 16/482,328 filed Jul. 31, 2019, which is a National Stage Entry of PCT/EP2018/052255 filed Jan. 30, 2018, which prior applications are hereby incorporated by reference in their entities.

The present invention relates to sheet silicate lamellae of a 2:1 sheet silicate with a high aspect ratio, to a method for producing these sheet silicate lamellae and to an aqueous dispersion which comprises the sheet silicate lamellae. The present invention further relates to the use of the sheet silicate lamellae of the invention for producing a composite material, and also to a corresponding composite material comprising or obtainable using the sheet silicate lamellae, more particularly for use as a diffusion barrier or as a flame retardant.

PRIOR ART

It is known from the prior art that composite materials are produced by admixing these composite materials with sheet silicates in order thereby to improve the mechanical properties of the resulting composite material. Success is also achieved in this way in improving the actual barrier properties of a composite system.

It has emerged that the extent of the improvement in the properties is critically dependent on the aspect ratio of the sheet silicates used. The concept of the aspect ratio refers very generally to the quotient of the mean diameter of a platelet and the platelet height. It is necessary here to make a fundamental distinction between the aspect ratio of an individual lamella and the average aspect ratio of an exfoliated or delaminated sample of a 2:1 sheet silicate. The aspect ratio of an individual lamella can be determined using atomic force microscopy (AFM). Since, however, values determined correspondingly for the aspect ratio are not representative of the entire sample of an exfoliated or delaminated 2:1 sheet silicate, the present invention employs what is called the average aspect ratio of the exfoliated or delaminated 2:1 sheet silicate. The average aspect ratio of the exfoliated or delaminated 2:1 sheet silicate is determined using static light scattering (SLS).

A fundamental rule is that the higher the aspect ratio, the better, for example, the barrier properties of the composite material comprising the sheet silicate.

Generally speaking, sheet silicates comprise stacks of silicate lamellae, known as tactoids, having heights ranging from several nanometers up to a few millimeters. The platelet diameters in the case of sheet silicates, depending on their composition and origin, amount to a few nanometers up to several centimeters.

It is known that the aspect ratio of sheet silicates can be increased within certain ranges, by chemical and/or physical treatment, through cleavage of the tactoids along their stacking axis. This process is known in the literature as exfoliation. It can be achieved, for example, by introducing swellable sheet silicates into a polar solvent.

The fundamental requirement for producing sheet silicates having extreme aspect ratios is that they exhibit a relatively large lateral extent of the platelets or tactoids. The lateral extent rises in principle with the layer charge. As the layer charge of the sheet silicates goes up, however, the problem arises that these sheet silicates no longer exfoliate when introduced into a polar solvent. It is common knowledge in the literature that sheet silicates in water exfoliate only up to a layer charge of ≤0.55 p.f.u. (per formula unit) (cf. K. Jasmund, G. Lagaly, Tonminerale und Tone, Struktur, Eigenschaften, Anwendungen und Einsatz in Industrie und Umwelt, Steinkopff, Darmstadt 1993).

In view of this limitation and of the desire to produce sheet silicates having extreme aspect ratios, there are a number of methods in existence in the prior art that have attempted to carry out exfoliation even of sheet silicates with such high layer charges, or even delamination thereof—that is, to bring about cleavage into individual lamellae.

For example, patent specifications U.S. Pat. Nos. 4,608, 303, 3,325,340, and also in EP 0282928B, describe a method for producing aqueous dispersions which comprise exfoliated 2:1 sheet silicates. No distinction is made in these specifications between the concepts of exfoliation and delamination, and consequently these terms are wrongly used synonymously therein. In view of the disclosure content of these specifications, it can be assumed that only exfoliation takes place there. A feature common to all of the methods in these specifications is that the 2:1 sheet silicates used are subjected to one or more ion exchange reactions with cations which have a high enthalpy of hydration and so lead to swelling of the cationic layers. Although these specifications carry out corresponding exchange reactions and swelling steps, the material does not exfoliate in water; instead, the additional action of external shearing forces is always required as well in order to bring about at least a partial exfoliation. Although exfoliation can be brought about with the methods described there, the mandatory action of external shearing forces is detrimental to the swollen 2:1 sheet silicate, with the consequence that it may, for example, initiate the breaking of tactoids. These methods, accordingly, are not suitable for producing materials with extreme aspect ratios.

WO 2011/089089 A1 aims, in contrast, to describe a method for producing sheet silicate platelets having a high aspect ratio. The method comprises A) the manufacture of a synthetic smectite of the formula $[M_{n/Valence}]^{inter}[M^1_m M^{II}_o]^{oct}[M^{III}_4]^{tet}X_{10}Y_2$ having a layer charge of between 0.8 and 1.0, and B) the exfoliation or delamination of the synthetic smectite from step A) to form sheet silicate platelets. As described on page 8 of that specification, step B) is carried out by introducing the synthetic smectite into a polar solvent, preferably into water. The aim of introduction into a polar solvent is to cause the smectite to undergo osmotic swelling, so producing an exfoliation or delamination. In spite of the very high layer charge, no chemical or physical treatment, supposedly, is necessary for exfoliation (cf. page 8, lines 14/15); accordingly, the teaching of this patent specification runs counter to the generally acknowledged statement that 2:1 sheet silicates having a theoretically calculated layer charge>0.55 p.f.u. do not exfoliate when introduced into a polar solvent. The sole example describes a method with lithium hectorite.

An article by Breu et. al. in Langmuir 2017 (33), pages 4816-4822, addresses the delamination of hectorites. From FIG. 3 in that publication it is apparent that sodium hectorite with a Lagaly layer charge of 0.6 does not delaminate.

It can therefore be assumed that with the method described in WO 2011/089089 A1 at least no delamination of sodium sheet silicates into lamellae can be achieved.

The prior art therefore describes only methods by which 2:1 sheet silicates can be cleaved into tactoids. By exfoliation it is possible to increase the aspect ratio of these tactoids. Since, however, exfoliation requires the action of external shearing forces, the aspect ratio is adversely affected in turn by breaking of the tactoids. Not known from the prior art, in particular, are any sheet silicate lamellae having extreme aspect ratios and a theoretically calculated layer charge of more than 0.55 p.f.u. The term "sheet silicate lamella" for the purposes of this invention refers to an individual platelet, in contradistinction to the stack of two or more platelets referred to as tactoids.

Problem

Against the background of the prior art, therefore, there continues to be a need to be able to provide sheet silicate lamellae having an extremely high aspect ratio. These sheet silicate lamellae are to be suitable more particularly for being able to be incorporated into a composite material in order to improve, among others, the barrier properties and flame retardancy properties of that composite material.

Solution to the Problem

The problems described above are solved by the subject matter identified in the claims and also by the preferred embodiments in that subject matter that are disclosed in the description hereinafter.

A first subject of the present invention, therefore, are sheet silicate lamellae obtainable by delaminating a 2:1 sheet silicate, having ordered interstratification, in water, comprising at least the steps of (i) preparing the 2:1 sheet silicate having an ordered interstratification by treating a 2:1 sheet silicate (A) with a solvent mixture of water and a monoalcohol having 1 to 4 carbon atoms that comprises an alkylammonium salt, wherein the 2:1 sheet silicate (A) has a Lagaly layer charge of 0.56 p.f.u. to 0.90 p.f.u. and the interlayers at least alternately have sodium cations, (ii) separating the 2:1 sheet silicate having an ordered interstratification from the solvent mixture of the alkylammonium salt, (iii) delaminating the 2:1 sheet silicate having an ordered interstratification by introducing the 2:1 sheet silicate having an ordered interstratification and separated under (ii) into water to produce an aqueous dispersion comprising sheet silicate lamellae, (iv) separating the sheet silicate lamellae from the dispersion prepared under (iii), characterized in that the sheet silicate lamellae have an average aspect ratio of at least 10 000.

A further subject of the present invention are sheet silicate lamellae of a 2:1 sheet silicate having an average aspect ratio of at least 10 000 to 50 000 and a Lagaly layer charge of 0.56 p.f.u. to 0.90 p.f.u.

The new sheet silicate lamellae obtainable by delaminating a 2:1 sheet silicate, having an ordered interstratification in water, and the sheet silicate lamellae of a 2:1 sheet silicate having an average aspect ratio of at least 10 000 to 50 000 and a theoretical layer charge of 0.56 p.f.u. to 0.90 p.f.u. are also referred to as sheet silicate lamellae of the invention.

The 2:1 sheet silicate having the ordered interstratification is also referred to in the context of the present invention as 2:1 sheet silicate (IS).

Likewise a subject of the present invention is a method for producing the sheet silicate lamellae of the invention by delaminating a 2:1 sheet silicate, having ordered interstratification, in water, comprising at least the steps of (i) preparing the 2:1 sheet silicate having an ordered interstratification by treating a 2:1 sheet silicate (A) with a solvent mixture of water and a monoalcohol having 1 to 4 carbon atoms that comprises an alkylammonium salt, wherein the 2:1 sheet silicate (A) has a Lagaly layer charge of 0.56 p.f.u. to 0.90 p.f.u. and the interlayers at least alternately have sodium cations, (ii) separating the 2:1 sheet silicate having an ordered interstratification from the solvent mixture of the alkylammonium salt, (iii) delaminating the 2:1 sheet silicate having an ordered interstratification by introducing the 2:1 sheet silicate having an ordered interstratification and separated under (ii) into water to produce aqueous dispersion comprising sheet silicate lamellae, (iv) separating the sheet silicate lamellae from the dispersion prepared under (iii).

A further subject of the present invention is an aqueous dispersion which comprises the sheet silicate lamellae of the invention. The use of the sheet silicate lamellae of the invention for producing a composite material is a further subject of the present invention. Also embraced by the present invention are corresponding composite materials comprising the sheet silicate lamellae of the invention, and also these composite materials for use as a diffusion barrier or as a flame retardant.

COMPREHENSIVE DESCRIPTION

First of all a number of terms used in the context of the present invention will be explained.

The measurement methods to be employed in the context of the present invention for determining certain characteristic variables are apparent from the Examples section. Unless explicitly indicated otherwise, these are the measurement methods to be used for determining the particular characteristic variable.

The concept of a sheet silicate is familiar to the skilled person. Sheet silicates, also known as phyllosilicates or layer silicates, are plateletlike minerals which are distinguished by their layered construction. These minerals comprise a multiplicity of polyanionic lamellae, which are composed of tetrahedral layers T and octahedral layers O. Depending on the construction of the polyanionic lamellae, a very general distinction is made between 1:1 sheet silicates and 2:1 sheet silicates. The polyanionic lamellae of a 1:1 sheet silicate are composed of one tetrahedral layer and one octahedral layer, whereas the polyanionic layers of a 2:1 sheet silicate are formed of two tetrahedral layers and one octahedral layer, with the two tetrahedral layers closing the octahedral layer in their middle. A corresponding structure of a 2:1 sheet silicate is depicted in FIG. 1.

The concept of the lamellae of a 2:1 sheet silicate therefore refers, in the context of the present invention, to exactly one polyanionic layer consisting of the sequence of a tetrahedral layer, an octahedral layer, and a tetrahedral layer, these layers being constructed as described hereinafter and being linked to one another. In the structure of a sheet silicate, two lamellae are joined to one another via what is called an interlayer, in which different cations are intercalated for charge compensation.

Figure 1:
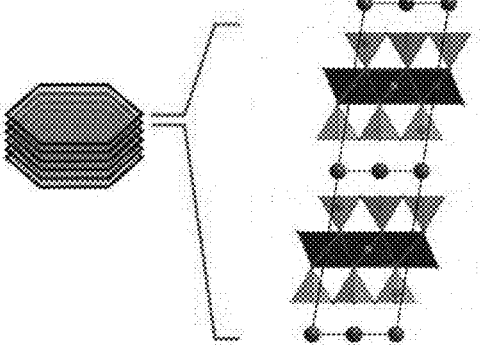
FIG. 1 is a depiction of a structure of a 2:1 sheet silicate according to embodiments disclosed herein.

Depicted on the left-hand side of FIG. 1 is a stack of multiple lamellae. Sheet silicates are in general stacked without a fixed phase relation to one another. In view of the absence of translation of symmetry in the third dimension, such stacks cannot be called crystals; instead, the term "tactoid" has become established. This term is used correspondingly in the present invention.

The tetrahedral layers of the sheet silicates consist of $SiO_4^{4-}$ and $AlO_4^{5-}$ units, which are triply corner-linked via the basal oxygen atoms. Each basal $O^{2-}$ connects an $Si^{4+}$—$Si^{4+}$ or an $Si^{4+}$—$Al^{3+}$ cation pair. The cations of the octahedral layers are normally $Mg^{2+}$ and/or $Al^{3+}$, although substitution of these cations by $Ni^{2+}$, $Cr^{3+}$, $Fe^{2+}$, $Fe^{3+}$, $Cu^{2+}$, $Zn^{2+}$, $Ti^{4+}$, $V^{3+}$, $Li^+$, $Co^{2+}$, and $Mn^{2+}$ is also possible. In the octahedral layer there are four common oxygen atoms and two additional hydroxyl groups and/or fluoride atoms coordinated to these cations. The tetrahedral layers are connected to the octahedral layer via a common anion plane.

The crystallinity of 2:1 sheet silicates is usually such as to enable a structural elucidation with atomic resolution customarily by means of usual diffraction techniques. It is usual here to employ single-crystal x-ray diffraction or powder diffraction.

The anionic structure per formula unit of a 2:1 sheet silicate is composed of $O_{10}X_2$ (where X is $OH^-$ or $F^-$), and so this anionic structure dictates a total of 22 negative charges per formula unit. These negative charges, however, are only partly compensated by the cations of the octahedron and of the two tetrahedra. The difference in the charge per formula unit (abbreviated to p.f.u.) is referred to as the layer charge. The charge neutrality of the 2:1 sheet silicate is ensured through what are called interlayer cations, which are intercalated between two polyanionic lamellae.

Given a known distribution of the cations in the 2:1 sheet silicate, as may be determined, for example, by x-ray diffraction, it is possible, on the basis of the charge of the anionic structure, to calculate the layer charge. Here, the sum total of the positive charges of the cations on the octahedral sites and on the tetrahedral sites per formula unit is subtracted from the 22 negative charges of the anionic structure. For example, for the 2:1 sheet silicate of the composition $Na_{0.65}[Mg_{2.4}Li_{0.55}\square]Si_4O_{10}F_2$, for the cations from the octahedron and from the two tetrahedra, the positive charge is 21.35. The difference between the 22 negative charges and the 21.35 positive charges gives a theoretical layer charge of 0.65.

In view of the fact that the anionic structure of 2:1 sheet silicates and their charge is predetermined, the layer charge is determined by the nature of the cations in the octahedra and tetrahedra. For increasing the layer charge of a 2:1 sheet silicate, therefore, it is preferred for cations of low charge to be used in the synthesis of the 2:1 sheet silicates.

The distribution density and the nature of these interlayer cations, which determines in particular the interlayer spacing between two lamellae of a 2:1 sheet silicate, has a substantial influence on the interlamellar interaction. The skilled person knows that interlayer cations of a 2:1 sheet silicate can be replaced by other cations in an exchange reaction. This exchangeability of the cations in the interlayers allows the production of 2:1 sheet silicates which have an ordered interstratification.

The atomic composition of a 2:1 sheet silicate and the associated layer charge are responsible for the macroscopic properties of a 2:1 sheet silicate and/or its lamella. Of particular relevance in this context is what is called the average aspect ratio, which is defined as the quotient of the mean diameter and the height of a tactoid or lamella. Since, in the context of the present invention, a distinction is made between a tactoid and a lamella, it is also necessary to make a distinction between the aspect ratio of a tactoid and of a lamella. If the present invention refers to the average aspect ratio, what this means is the average aspect ratio in relation to the sheet silicate lamellae of the invention.

The average aspect ratio of an exfoliated or delaminated 2:1 sheet silicate is determined using static light scattering (SLS) according to DIN 13320 (status: 2009).

It is possible to increase or reduce the aspect ratio by means of various operations. In principle the aspect ratio is reduced by accreting a number of primary tactoids to form a pseudotactoid, or by breaking a tactoid or a lamella. Conversely, the aspect ratio is improved by exfoliation or by delamination of a tactoid. In the literature, incorrectly, the concepts of exfoliation and of delamination, respectively, are in some cases used synonymously. In its correct use, the term "exfoliation" denotes the cleaving of a tactoid into thinner tactoids. The term "delamination" on the other hand, describes the cleaving of a tactoid into the individual lamellae. For the purposes of this invention, a distinction is made between the two terms exfoliation and delamination, and the definitions explained above are valid.

Figure 2:
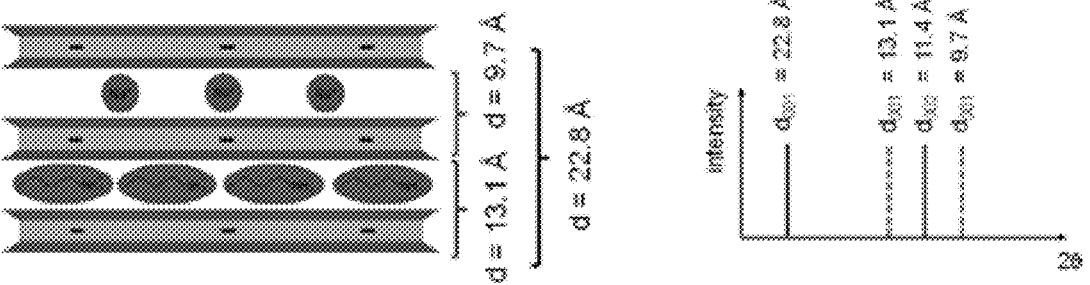
FIG. 2 is a schematic depiction of an interstratified phase with a d value according to embodiments disclosed herein.

The concept of ordered interstratification is known from technical literature (cf. Stöter et al., Chem. Mater. 2014, 26, 5412-5419) and describes an incidence of a statistically alternating cation occupancy of the interlayer spaces of a 2:1 phyllosilicate. In other words this means that on statistical average every second interlayer has the same kind of interlayer cations, and preferably the respective interlayer has only one kind of cation. By way of example, and in simplified terms, this means that a first interlayer contains only sodium cations. In the next interlayer there is then, in turn, a different kind of a cation, such as an n-butylammonium cation, for example. The next interlayer is then identical again to the first interlayer, and the fourth interlayer is identical to the second. The consideration above is a simplified consideration for the purpose of illustration. Because 2:1 sheet silicates are materials of highly complex construction, defects may occur, and so the interstratification is also said to be ordered when a corresponding structure is present on statistical average. The presence of the interstratified phase is visible in the powder diffractogram by the appearance of a superstructure reflection. This has a d value which corresponds to the summated interplanar spacings of the fully exchanged phases. For an explanation, refer to FIG. 2, in which this is reproduced schematically. The quality of the alternation of both layers is determined by the interlayer spacing of the superstructure, averaged from the 00I series, and the coefficient of variation therein. If the latter is below 0.75%, an ordered alternating layer may be said to be present, and the 00I series is then identified as rational and it follows Bragg's law (cf. S. W. Bailey, Amer. Mineral. 1982, 67, 394-398).

The skilled person knows that the swelling behavior of a 2:1 sheet silicate is dependent on the nature of the interlayer cation and on its enthalpy of hydration, and also on the layer charge, the temperature, the pressure, and the electrolyte background. Because of the competing forces of attraction (e.g., coulomb attraction between lamella and interlayer cations, van der Waals forces) and repulsion (e.g., coulomb repulsion of the lamellae with one another) between silicate lamellae, there may be different swelling behaviors, which can be subdivided in principle into two areas.

In the first area, a defined number of water layers are accommodated in the interlayer space, this also being referred to as crystalline swelling by incremental hydration. 2:1 Sheet silicates are normally capable of forming structures having one water layer and having two water layers. Where the 2:1 sheet silicate comprises interlayer cations having a high enthalpy of hydration, such as $Li^+$ or $Mg^{2+}$, for example, it is also possible for structures having three water layers to be formed. Where swelling goes beyond the formulation of discrete water layers, this is referred to as osmotic swelling. 2:1 sheet silicates which undergo complete osmotic swelling may delaminate into lamellae.

The Sheet Silicate Lamellae of the 2:1 Sheet Silicate

The sheet silicate lamellae of the invention are obtainable by the delamination of a 2:1 sheet silicate having an ordered interstratification. The corresponding sheet silicate lamellae have an average aspect ratio of at least 10 000, preferably of at least 12 000, more preferably of at least 15 000, and more preferably still of 20 000. The average aspect ratio is preferably in a range from at least 10 000 to 50 000, more preferably in a range from at least 12 000 to 50 000, more preferably in a range from at least 15 000 to 50 000, and even more preferably in a range from at least 20 000 to 50 000.

It is essential to the invention, furthermore, that the sheet silicate lamellae have a Lagaly layer charge of at least 0.56 p.f.u to at most 0.9 p.f.u. The sheet silicate lamellae preferably have a Lagaly layer charge of at least 0.56 p.f.u, of at least 0.58 p.f.u., of at least 0.60 p.f.u., of at least 0.62 p.f.u., of at least 0.64 p.f.u., of at least 0.65 p.f.u., and of at most 0.90, of at most 0.85 p.f.u., of at most 0.80 p.f.u., of at most 0.75 p.f.u., of at most 0.70 p.f.u., of at most 0.68 p.f.u., of at most of at most 0.65 p.f.u. It is particularly preferred for the Lagaly layer charge of the sheet silicate lamellae to be in a range from at least 0.56 p.f.u. to at most 0.80 p.f.u., more preferably in a range from at least 0.56 p.f.u to at most 0.75 p.f.u., more preferably in a range from at least 0.56 p.f.u. to at most 0.70 p.f.u., more preferably in a range from 0.56 p.f.u. to at most 0.65 p.f.u.

To produce the 2:1 sheet silicate having an ordered interstratification, a 2:1 sheet silicate (A) is treated with a solvent mixture of water and a monoalcohol having 1 to 4 carbon atoms and comprising an alkylammonium salt.

The 2:1 sheet silicate (A) has a Lagaly layer charge of at least 0.56 p.f.u to at most 0.9 p.f.u. Preferably the 2:1 sheet silicate (A) has a Lagaly layer charge of at least 0.56 p.f.u, of at least 0.58 p.f.u., of at least 0.60 p.f.u., of at least 0.62 p.f.u., of at least 0.64 p.f.u., of at least 0.65 p.f.u., and of at most 0.90, of at most 0.85 p.f.u., of at most 0.80 p.f.u., of at most 0.75 p.f.u., of at most 0.70 p.f.u., of at most 0.68 p.f.u., of at most of at most 0.65 p.f.u. It is particularly preferred for the Lagaly layer charge of the sheet silicate lamellae to be in a range from at least 0.56 p.f.u. to at most 0.80 p.f.u., more preferably in a range from at least 0.56 p.f.u to at most 0.75 p.f.u., more preferably in a range from at least 0.56 p.f.u. to at most 0.70 p.f.u., more preferably in a range from 0.56 p.f.u. to at most 0.65 p.f.u.

Furthermore, the structure of the 2:1 sheet silicate (A) is such that the interlayers at least alternatingly have sodium cations.

The 2:1 sheet silicate (A) used as starting material is preferably a 2:1 sheet silicate produced by melt synthesis.

2:1 sheet silicates produced by melt synthesis customarily have the advantage that they can be produced in a high purity. Disadvantages, however, are the temporal length and complexity of apparatus for the synthesis, and also the associated high costs. With a melt synthesis, compounds of the desired metals, such as salts, oxides or glasses, for example, are heated in a stoichiometric ratio, in an open or closed crucible system, to form the homogeneous melt, and are subsequently cooled down again.

The melt synthesis is carried out preferably in a closed crucible system. In the case of synthesis in a closed crucible system, the starting compounds used may be alkali metal salts/alkaline earth metal salts, alkaline earth metal oxides, silicon oxides, and aluminum oxides, preferably binary alkali metal fluorides/alkaline earth metal fluorides, alkaline earth metal oxides, and silicon oxides, more preferably LiF, NaF, $MgF_2$, MgO, and quartz.

The charging of the crucible is preferable such that the more volatile substances are weighed in first. Typically a high-melting crucible is used that is made of chemically inert or slow-to-react metal, preferably of molybdenum or platinum.

After charging, the still open crucible, before being closed, is baked under reduced pressure at temperatures between 200° C. and 1100° C., preferably between 400 and 900° C., in order to remove residual water and volatile impurities. In experimental terms the procedure is preferably such that the upper edge of the crucible is heated until it glows red, while the lower crucible region has lower temperatures.

A preliminary synthesis is carried out optionally in the crucible, after the latter has been provided with pressure-tight closure, and at 1700 to 1900° C., more preferably at 1750 to 1850° C., for 5-20 minutes in order to homogenize the reaction mixture. The baking and also the preliminary synthesis are typically carried out in a high-frequency induction furnace. The crucible in this case is protected from oxidation by an inert atmosphere (e.g., argon), reduced pressure, or a combination of both measures. The principal synthesis is carried out with a temperature program adapted to the material. This synthesis step is carried out preferably in a graphite rotary tube furnace with horizontal alignment of the axis of rotation. In a first heating step, the temperature is increased at a heating rate of 1 to 50° C./min, preferably of 10 to 20° C./min, from room temperature to 1600 to 1900° C., preferably to 1700 to 1800° C. In a second step, the heating takes place at 1600 to 1900° C., preferably at 1700 to 1800° C. The heating phase of the second step lasts preferably 10 to 240 minutes, more preferably 30 to 120 minutes. In a third step, the temperature is lowered at a cooling rate of 10-100° C./min, preferably of 30 to 80° C./min, to a level of 1100 to 1500° C., preferably of 1200 to 1400° C. In a fourth step, the temperature is lowered with a cooling rate of 0.5 to 30° C./min, preferably of 1 to 20° C./min, to a level of 1200 to 900° C., preferably of 1100 to 1000° C. After the fourth step, the reduction in the heating rate to room temperature (23° C.) takes place with a rate for example of 0.1-100° C./min, preferably without control, by the furnace being switched off.

It is typical to operate under inert gas such as Ar or $N_2$, for example. The 2:1 sheet silicate (A) produced by melt synthesis is obtained as a crystalline solid after the crucible has been broken open.

After the synthesis, the 2:1 sheet silicate (A) is preferably heated again in order to increase the homogeneity of the sample. In this case it is usual to use temperatures in the range from 800 to 1150° C. More preferably, the heating takes place at a temperature 100° C. below the melting point of the 2:1 sheet silicate (A) produced by melt synthesis.

It is also possible to carry out the melt synthesis in an open crucible system. In the case of synthesis in an open crucible system, preference is given to using a glass stage of the general composition $wSiO_2 \cdot xM^a \ yM^b$-$zM^c$, where $5<w<7$; $0<x<4$; $0<y<2$; $0<z<1.5$ and $M^a$, $M^b$, and $M^c$ are metal oxides and $M^a$ is different from $M^b$ is different from $M^c$. $M^a$, $M^b$, and $M^c$ may independently of one another be metal oxides, preferably $Li_2O$, $Na_2O$, $K_2O$, $Rb_2O$, $MgO$, more preferably $Li_2O$, $Na_2O$, $MgO$. $M^a$ is different from $M^b$ is different from $M^c$.

The glass stage in the desired stoichiometry is produced from the desired salts, preferably the carbonates, more preferably $Na_2CO_3$, and also from a silicon source such as, for example, silicon oxides, preferably silica. The pulverulent constituents are converted by heating and rapid cooling into a glasslike state. The conversion is carried out preferably at 900 to 1500° C., more preferably at 1000 to 1300° C. The heating phase in the production of the glass stage lasts 10 to 360 minutes, preferably 30 to 120 minutes, more preferably 40 to 90 minutes. This operation is typically carried out in a glass carbon crucible under an inert atmosphere and/or reduced pressure, by means of high-frequency induction heating. The reduction in the temperature to room temperature is accomplished by the oven being switched off. The resulting glass stage is then finely ground, which can be done using a powder mill, for example.

The glass stage is admixed with further reaction partners in a weight ratio of 10:1 to 1:10. Preferred are 5:1 to 1:5. Examples of these partners are alkali metal or alkaline earth metal compounds and/or silicon compounds. Preference is given to using light alkali metal and/or alkaline earth metal fluorides, and also their carbonates or oxides, and also silicon oxides. Particular preference is given to using NaF, $MgF_2$, and/or a calcined mixture of $MgCO_3Mg(OH)_2$ and silica.

The mixture is subsequently heated above the melting temperature of the eutectic of the compounds used, preferably 900 to 1500° C., more preferably 1100 to 1400° C. The heating phase lasts preferably 1 to 240 minutes, more preferably 5 to 30 minutes. Heating is to be carried out with a heating rate of 50-500° C./min, preferably with the maximum possible heating rate of the furnace. The cooling after the heating phase to room temperature takes place at a rate of I-500° C./min, preferably without control, by the oven being switched off. The product is obtained as a crystalline, hygroscopic solid.

The synthesis is carried out preferably in a glass carbon crucible under an inert atmosphere. Heating is accomplished typically by high-frequency induction.

Besides the 2:1 sheet silicates (A) produced by melt synthesis, it is also possible to employ commercially available starting materials. These are available, for example, under the tradename Somasif from CO-OP Chemical Company, or under the tradename Laponite from Byk Chemie GmbH.

It is, however, also possible for the 2:1 sheet silicate (A) to be a naturally occurring sheet silicate, i.e., for the natural 2:1 sheet silicate (A) to fulfil the conditions in relation to the stratification and the occupancy of the interlayers in its naturally occurring form. Such natural 2:1 sheet silicates, however, are encountered fairly seldom.

It is therefore preferable to treat naturally occurring 2:1 sheet silicates, which have a layer charge of at least 0.56, with an aqueous solution of a sodium salt, in order to exchange the cations of the interlayers of the naturally occurring sheet silicate by sodium cations and so as to produce a 2:1 sheet silicate (A) in the sense of the present invention.

To produce the 2:1 sheet silicate having an ordered interstratification, the 2:1 sheet silicate (A) is treated with a solvent mixture of water and monoalcohol having 1 to 4 carbon atoms that comprises an alkylammonium salt.

The term "treating" in the context of this invention means that the 2:1 sheet silicate (A) is introduced into the solvent mixture comprising an alkylammonium salt, to give a suspension. This suspension is stored preferably at a temperature of 10 to 50° C., more preferably at 20 to 35° C. and with further preference at room temperature (23° C.). Storage takes place preferably in an overhead shaker for a period of 1 to 72 hours, preferably for a period of 8 to 48 hours, and with further preference for a period of 16 to 30 hours, the suspension being moved continuously with the overhead shaker.

The solvent mixture for treating the 2:1 sheet silicate (A) is a mixture of water with a monoalcohol having one to four carbon atoms. It is necessary to use such a mixture for treating the 2:1 sheet silicate (A) in order to prevent partial exfoliation during the exchange reaction.

The preferred mixing ratio of the solvent mixture is in the range from 1:3 (water:monoalcohol) to 3:1 (water:monoalcohol), more preferably in a range from 1:2 (water:monoalcohol) to 2:1 (water:monoalcohol).

It is necessary for the solvent mixture used to permit the establishment of an equilibrium during the partial exchange, in order to enable the thermodynamically stable interstratification by intercalation. For the establishment of an equilibrium, all of the participating kinds of ions must be soluble in the solvent mixture. In this way, healing of defect layers is made possible, such layers being formed, for example, when the nucleation to give the phase with interstratification begins in a plurality of layers in the tactoid and hence, after ongoing growth of the ordered interstratification, two adjacent interlayer spaces are filled with the same ions. Furthermore, there should be a widening of the interlayer space in the solvent, so that the intracrystalline reaction is not inhibited kinetically.

The monoalcohol has 1 to 4 carbon atoms. The term "monoalcohol" in the sense of this invention refers to a compound which has one —OH group. The carbon chain of the monoalcohol may be branched or unbranched. The monoalcohol is preferably selected from the group consisting of methanol, ethanol, n-propanol, isopropanol, n-butanol, isobutanol, 2-butanol, tert-butanol, and mixtures thereof. With particular preference the monoalcohol is selected from the group consisting of methanol, ethanol, n-propanol, isopropanol, and mixtures thereof.

The alkylammonium salt which is present in the solvent mixture of water and a monoalcohol is preferably an alkylammonium salt which in the alkyl chain has two to eight carbon atoms. The carbon chain may be branched or unbranched. The counterions of the alkylammonium salt are preferably selected from the group consisting of halogen, such as chloride and bromide, formate, methylsulfate, sulfate, nitrate, hydroxide, acetate, phosphates, and mixtures thereof, more preferably chloride, bromide, formate, and methylsulfate.

The alkylammonium salt is preferably selected from the group consisting of the salts of ethylamine, n-propylamine, n-butylamine, sec-butylamine, tert-butylamine, n-pentylamine, tert-amylamine, n-hexylamine, sec-hexylamine, n-heptylamine, 2-ethyl-1-hexylamine, n-heptylamine, 2-amino-heptane, n-octylamine, and tert-octylamine, more preferably from the group consisting of the salts of ethylamine, n-propylamine, n-butylamine, sec-butylamine, and tert-butylamine.

The concentration of the alkylammonium salt in the solvent mixture is preferably 0.5 to 100.0 mmol/L, better still 1.0 to 50.0 mmol/L, better still 2.5 to 6.0, and even better still 3.0 to 4.0 mmol/L. The solvent mixture preferably contains only one kind of an alkylammonium salt.

Following treatment of the sheet silicate (A) with a solvent mixture comprising an alkylammonium salt, to prepare the 2:1 sheet silicate having an ordered interstratification, the 2:1 sheet silicate is separated in step (ii) from the solvent mixture comprising the alkylammonium salt. Separation technologies contemplated in principle include all solid/liquid separating methods familiar to the skilled person, particularly those of filtration, decanting or else evaporation of the solvent.

The 2:1 sheet silicate separated in step (ii) is preferably washed with a solvent mixture of water and monoalcohol having 1 to 4 carbon atoms. The composition of the solvent mixture is preferably the same as that of the solvent mixture used under (i). The washing process is repeated preferably one to five times, better still two to four times. Following this washing process, there are preferably additionally one to four, better still two to three, washing processes with the monoalcohol of solvent mixture alone.

In step (iii), the 2:1 sheet silicate (IS) is delaminated by introduction of the 2:1 sheet silicate (IS), separated beforehand in step (ii), into water. Introduction into water causes the osmotic swelling of the cations in the interlayers, and so there is delamination.

The process of delamination customarily takes place within a limited time frame. This would mean that the delamination takes place preferably within 60 minutes, better still within 30 minutes, and even better still within 15 minutes. It is especially preferable for the delamination to proceed as what is called "spontaneous delamination". The concept of "spontaneous delamination" is widespread in the literature and means that the 2:1 sheet silicate (IS) delaminates into its sheet silicate lamellae within a few seconds to a few minutes.

It is therefore particularly preferred for the 2:1 sheet silicate (IS) to delaminate within 5 minutes, more preferably within 3 minutes, more preferably still within 1 minute, and very preferably in less than 1 minute.

The delamination of the 2:1 sheet silicate in the context of this invention takes place preferably even without the action of external shearing forces, after the 2:1 sheet silicate (IS) has been introduced into the water.

For the delamination, the 2:1 sheet silicate is introduced into water. The water used is preferably fully demineralized water (FD water), and more preferably the cation concentration in the water used is less than 100 mmol/l, preferably less than 5 mmol/l. Preferably, the fraction of organic impurities is less than 20 vol %, preferably less than 5 vol %.

As a result of the delamination of the 2:1 sheet silicate (IS) into water, an aqueous dispersion is formed which comprises the sheet silicate lamellae of the invention. In step (iv), the sheet silicate lamellae are separated from this aqueous dispersion. Separation technologies contemplated include in principle all solid/liquid separating methods familiar to the skilled person, more particularly filtration, decanting, or else the evaporation of the solvent.

A further subject of the present invention is an aqueous dispersion comprising the sheet silicate lamellae of the invention.

The aqueous dispersion of the invention can be obtained as an intermediate of the delamination of the 2:1 sheet silicate (IS). A corresponding aqueous dispersion is obtained in step (iii) by introduction of the 2:1 sheet silicate (IS) into water. Furthermore, however, the aqueous dispersion of the invention also comprises an aqueous dispersion of the sheet silicate lamellae of the invention which is obtainable by redispersing the sheet silicate lamellae obtained after step (iv).

A further subject of the present invention is a method for producing the sheet silicate lamellae of the invention by the delamination of a 2:1 sheet silicate, having an ordered interstratification, in water. The method steps to be employed accordingly have already been described comprehensively above. For the method of the invention, the statements made above apply in the same way.

The Use and the Composite Material

Furthermore, the use of the sheet silicate lamellae of the invention for producing a composite material is a subject of the present invention.

The term "composite material" is familiar to the skilled person and is the collective designation for those materials which are obtained through combination of different materials, and whose chemical and physical properties exceed those of the individual components (cf. Rompp Chemie Lexikon, volume 6. T-Z, 9th expanded and revised edition, Georg Thieme Verlag 1995, p. 4886). Constituents of the composite materials are primarily metals, wood, glasses, polymers, and ceramic materials, which may be processed into fiber, tape, layer, and particle composite materials.

In the context of the present invention, a composite material of the invention comprises at least one polymer and also the sheet silicate lamellae of the invention.

The use of the composite material as a diffusion barrier, specifically, offers numerous advantages, since diffusion processes are universal and in many cases give rise to problems of commercial relevance.

For example, the lifetime of CDs and DVDs is limited to a few decades, because the underside of the polycarbonate is permeable to oxygen and water, and consequently the metallic aluminum reflection layer undergoes continuous oxidation and, consequently, clouding.

A further problem arises in the packaging industry, since the permeability of standard packaging is relatively high, and so here it is necessary to switch to barrier technologies. As a result of the processing of the sheet silicate lamellae of the invention into packaging materials and packaging films for the food industry, it is therefore possible to increase the keeping properties of foods, since the extreme aspect ratio of the sheet silicate lamellae greatly prolongs the diffusion pathways of gases, such as oxygen, hydrogen, and gaseous water, for example, and the barrier properties can therefore be improved.

It is appropriate not only, however, to incorporate the sheet silicate lamellae of the invention into food packaging in order to prevent the action of external influences, such as the penetration of oxygen, for example, into the packaging. The sheet silicate lamellae of the invention are also suitable, for example, for incorporation into materials for producing plastic bottles, in order to prevent the escape of $CO_2$ from carbonated beverages.

To produce composite materials comprising the sheet silicate lamellae of the invention, they can be incorporated into all common polymers, produced by polycondensation, polyaddition, radical polymerization, ionic polymerization, and copolymerization. Examples of polymers of these kinds are polyurethanes, polycarbonates, polyamides, polymethyl methacrylates (PMMA), polyesters, polyolefins, rubber, polysiloxanes, ethylene-vinyl alcohol copolymers (EVOH), polylactides, polystyrenes, polyethylene oxides (PEO), polypropylene oxides (PPO), polyacrylonitriles (PAN), and polyepoxides.

Incorporating the sheet silicate lamellae of the invention into the polymer for the purpose of producing the composite material may be done by means of common techniques known to the skilled person. These include, for example, mixing in solution, polymerization in situ, or mixing in the melt.

The present invention also embraces corresponding composite materials which comprise the sheet silicate lamellae of the invention. These composite materials identified as being in accordance with the invention are used preferably as a diffusion barrier or as a flame retardant.

EXAMPLES

Chemicals and Materials

For the melt synthesis of a 2:1 sheet silicate (A1), NaF (99.995%, Alfa Aesar), LiF (>99.9%, ChemPur), $MgF_2$ (>99.9%, ChemPur, fused lump 1-3 mm), MgO (99.95%, Alfa Aesar, fused lump 1-3 mm), MgO (99.95, Alfa Aesar, powder) and $SiO_2$ (Merck, fine granular quartz, p.a., calcined) were used. The chemicals were stored in a glovebox under dry argon. The molybdenum crucibles (25 mm outer diameter, 21 mm inner diameter, 143 mm inner length) were produced by drilling from a pure molybdenum rod. The crucible was washed with acetone and cleaned in an ultrasound bath and with FD water. For the final clean, it was heated before use at 1600° C. for 5 minutes under a high vacuum ($<1.0 \times 10^{-7}$ bar).

The preparation of n-alkylammonium solutions for experimental determination of the layer charge took place by titration of the n-alkylamines with HCl (32%, NORMA-PUR, VWR) or HCl (2M, Titripur, Sigma Aldrich). Amines used were n-butylamine (99.5%, Sigma Aldrich), n-pentylamine (>98%, TCI Chemicals), n-hexylamine (99.9% Aldrich), n-heptylamine (99.9%, Sigma Aldrich), n-octylamine (95%, Sigma Aldrich), n-nonylamine (>99%, Alfa Aesar), n-decylamine (95%, Sigma Aldrich), n-undecylamine (>98%, Sigma Aldrich) and n-dodecylamine (>98%, Sigma Aldrich).

Solvents used were ethanol ((absolute, VWR), FD water, Millipore water (18.2 μS/cm) and double-distilled water. Unless otherwise indicated, FD water was used.

The neutralization of n-butylamine for use for the partial exchange took place by preparation of a standard solution with formic acid (p.a., Sigma Aldrich).

Solids were digested using HCl (30 wt %, Merck, SUPRAPUR), $H_3PO_4$ (85 wt %, Merck, EMSURE), $HNO_3$ (65 wt %, Merck, SUPRAPUR) and $HBF_4$ (48 wt %, Sigma Aldrich).

For determining the cationic exchange capacity, [Cu (trien)]$SO_4$ was used. The 0.01 M standard solution was prepared from $CuSO_4$ (for analysis, Grusing, calcined 24 h, 250° C.) and triethylenetetramine (>97%, Sigma Aldrich).

Description of Methods

Powder Diffractometry

Transmission Geometry

Powder diffractograms of the 2:1 sheet silicate (A) described below, prepared by melt synthesis, for structural elucidation were recorded in transmission geometry on a STOE Stadi P diffractometer with MYTHEN1K detector and Cu-$K_{\alpha 1}$ radiation ($\lambda$=1.54056 Å). Texture effects were minimized by using glass capillaries (0.7 mm, Hilgenberg, glass No. 10). Prior to the measurement, the sample was stored for four weeks in desiccators over saturated solutions of $K_2CO_3$ (43% relative humidity) and $K_2SO_4$ (98% relative humidity). Samples for dry measurement were dried at 150° C. for 24 hours.

Bragg-Brentano Geometry

All further powder diffractograms were measured in Bragg-Brentano geometry on a Panalytical XPERTPRO diffractometer. Texture samples were prepared by dropwise application to glass slides (Gerhard Menzel GmbH) from ethanolic suspension. Measurement took place at room temperature (23° C.).

Humidity Chamber

Measurements in the humidity chamber were carried out in the XPERTPRO diffractometer in an Anton Paar humidity chamber containing a moisture generator (RH-200, VTI corp.). Measurement took place in the relative humidity range from 10% to 95%. At each step the samples were equilibrated until no change was observed in the positions of the reflections (at least for 90 minutes), and were baked before the adsorption experiment at 80° C. until the structure for measurement was exclusively that without any water layer. Measurement took place at 30° C.

Experimental Determination of Layer Charge

The charge on the layer can be determined experimentally by the method of Lagaly (cf. A. R. Mermut, G. Lagaly, Clays Clay Miner. 2001, 49, 393-397) via the intercalation of n-alkylammonium solutions with different n-alkyl chain lengths and the measurement of the resulting interplanar spacings. For this purpose, around 90 mg of the sample were suspended in 3 mL of ethanol/water (1:1) in an overhead shaker for at least 2 hours. 2.5 mL of the n-alkylammonium solution (2 M for chain length n=4 to 6, 0.5 M for n=7 to 10, 0.1 M for n=11 and 12) were added and the sample was stored in the drying cabinet at 60° C. (at least 3 hours). After centrifuging and decanting, the addition was repeated five times. To conclude, washing took place ten times with ethanol/water (1:1) and twice with ethanol. The texture samples for powder diffraction were dried at 60° C. (24 hours) and measured within 10 minutes in the Bragg-Brentano geometry.

Determination of the CEC

The CEC was determined by the Cu(trien) method (cf. L. Ammann, F. Bergaya, G. Lagaly, Clay Miner. 2005, 40, 441-453). For this purpose, around 45 mg of the 2:1 sheet silicate (A1) prepared by melt synthesis were baked at 150° C. for 24 hours, stored in the glovebox under dry argon for 24 hours, and weighed out therein. 10 mL of water were added, the sample was swollen in the overhead shaker at 24 hours, and then 5 mL of 0.01 M [Cu(trien)]$SO_4$ solution were added. Exchange was carried out for 24 hours. The sample was centrifuged (10 000 rpm, 20 min, 20° C.) and the Cu concentration of the supernatant solution was measured on a UV/VIS spectrometer (Cary 300). This was done using the absorption to maximum $[Cu(trien)]^{2+}$ at 577 nm. Calibration standards used were $[Cu(trien)]SO_4$ stock solutions diluted 1:1, 1:3; 1:9 and 1:19.

Particle Size Determination

For particle size determination, the samples were first swollen in a 1 wt % suspension in fully demineralized water for 24 hours.

Static Light Scattering (SLS)

The particle sizes were determined using the method of static light scattering in accordance with DIN 13320 (status: 2009). For this purpose, using a Retsch LA-950 (Horiba) instrument, the manufacturer's measurement routine "Sheet silicates in water" was used. Here, the refractive index for the solid phase was 1.5. The measurement program determined the optimum transmission rate and thus optimized the concentration of the suspension. The number-weighted particle size distribution was ascertained.

SAXS (Small Angle X-Ray Scattering) Measurements

The sheet silicate lamellae of the invention were measured on a Double Ganesha AIR small-angle scattering system (SAXSLAB). The x-ray source was a rotating anode (Cu, MicroMax 007HF, Rigaku Corp.) which furnishes a microfocused beam. The PILATUS 300K spatially resolved detector (Dectris AG) was used. The measurement took place in glass capillaries 1 mm in diameter (glass No. 50, Hilgenberg) at room temperature (23° C.). The radially averaged data was standardized to the primary beam and the measurement time, after which the solvent was removed. Data analysis was carried out in accordance with M. Stöter, B. Biersack, S. Rosenfeldt, M. J. Leitl, H. Kalo, R. Schobert, H. Yersin, G. A. Ozin, S. Förster, J. Breu, Angew. Chem. Int. Ed. 2015, 54, 4963-4967.

SAXS measurements allow measurement down to extremely small scattering angles, thereby enabling the visualization of large interplanar spacings. The d value, especially d(001), corresponds to the mean distance between the osmotically swollen lamellae.

Atomic Force Microscopy (AFM)

Atomic force recordings were measured in tapping mode on a dimension 3100 NanoScope IV-AFM with an OTESPA-R3 (Bruker) silicon cantilever. The drive amplitude was 249.5 Hz. The samples were prepared by dropwise application of a dispersion in Millipore water (around 0.05 g/L) to a silicon wafer and by drying under ambient humidity at room temperature (23° C.). Prior to the measurement, the samples were dried at 80° C. for 1 hour.

The examples which follow serve to elucidate the invention, but should not be interpreted as imposing any limitation.

Synthesis of the 2:1 Sheet Silicate (A1)

For the synthesis of the 2:1 sheet silicate (A1), for which the nominal composition is $Na_{0.65}[Mg_{2.4}Li_{0.55}\square_{0.05}]$ $Si_4O_{10}F_2$, 3.381 g of NaF (41.988 g/mol, 80.53 mmol, 0.65 eq), 1.768 g of LiF (25.939 g/mol, 68.14 mmol, 0.55 eq), 3.088 g of $MgF_2$ (62.301 g/mol, 49.56 mmol, 0.4 eq), 9.987 g of MgO (40.304 g/mol, 247.78 mmol, 2 eq), and 29.777 g of $SiO_2$ (60.084 g/mol, 247.79 mmol, 4 eq) were weighed out into a molybdenum crucible in a glovebox under dry argon.

The synthesis consisted overall of five steps: (A) the baking of the synthesis apparatus, (B) the fusing-closed of the crucible, (C) the testing of the crucible for imperviousness, (D) the melt synthesis, and (E) the heat treatment.

(A) To avoid oxidation of the crucible, operations took place under a high vacuum ($<10^{-7}$ bar) and hence at an oxygen fugacity below the stability range of molybdenum oxide. The crucible was subjected to inductive baking to remove water, using a copper coil approximately 1 cm in width and composed of four close-lying turns. In this operation, moderate temperatures of around 250° C. were used in order to prevent the volatilization of fluorides in the high vacuum.

(B) The crucible lid was lowered under a high vacuum. Using the narrow copper coil, which enables brief heating to just under 3000° C., the crucible was fused closed. During this procedure, cooling took place from the bottom end of the crucible, using a copper tube with water flowing through it. This was intended to prevent the fluorides melting in the bottom region of the crucible, since these fluorides would otherwise undergo partial evaporation under high vacuum. For this reason, the fluorides were weighed out first into the crucible.

(C) The resulting reaction vessel was heated on a corundum rod with a wide copper coil of 22 turns, the heating being brief and at around 1750° C., in order to test the crucible for imperviosity.

(D) The crucible was heated to 400° C. over the course of 30 minutes under argon in a rotary tube furnace (HT-1900 graphite, Linn High Term) at around 45 rpm. The maximum temperature of 1750° C. was reached over the course of a further 90 minutes. The hold time at this temperature was 70 min. This was followed by cooling to 1300° C. over the course of 8 minutes, and to 1050° C. in a further 25 minutes, after which the furnace was shut down.

(E) The resulting material was ground (250 rpm, 20 minutes, Retsch PM-100), dried under reduced pressure (<0.1 mbar) at 250° C. overnight, and placed under argon in a glovebox, in a molybdenum crucible. The crucible was baked and fused closed as described under (A) and (B). The gastight reaction vessel was introduced into a quartz ampule, which had been fused closed under reduced pressure (<0.1 mbar). The next step is the heat treatment of the material at 1045° C.

X-ray powder diffraction demonstrated that the 2:1 sheet silicate (A1) has the nominal composition $Na_{0.65}$ $[Mg_{2.4}Li_{0.55}\square_{0.05}]Si_4O_{10}F_2$. The nominal composition was determined using the measured powder diffractogram of the crystalline-swollen phase with two water layers. In accordance with H. Kalo (cf. H. Kalo, W. Milius, J. Breu, RSC Adv. 2012, 2, 8452-8459 and H. Kalo, Dissertation, University of Bayreuth, 2012), a monoclinic cell was used (C2/m, No. 12). The starting parameters for the refinement were adopted from H. Kalo, W. Milius, J. Breu, RSC Adv. 2012, 2, 8452-8459 and adapted so that the 00I series and also the 060 band could be found. The resulting lattice constants are shown in table 2.

TABLE 1 lattice constant refinement of (A1) with 2 water layers (Monoclinic, C2/m (12)) by means of starting parameters from H. Kalo, W. Milius, J. Breu, RSC Adv. 2012, 2, 8452-8459. The parameters were adapted so as to allow the 00I series and the 060 band to be found.

| | a [Å] | b [Å] | c [Å] | α = γ [°] | β [°] |
|---|---|---|---|---|---|
| (A1) (2 water layers) | 5.245(3) | 9.077(4) | 15.217(9) | 90 | 96.591(9) |

The layer charge of the 2:1 sheet silicate (A1) was determined experimentally by the method of Lagaly. For this purpose, n-alkylammonium ions of different chain length $(C_nH_{2n+1}NH_3^+)$ and of known charge equivalent area were intercalated into the interlayers of (A1). Depending on whether, at a particular alkyl radical chain length, monolayers $(d_{001}=13.1$ to 13.3 Å) or bilayers $(d_{001}=17.5$ to 17.8 Å) were formed, and depending on the chain length from which this was no longer possible, it was possible to localize the range of the layer charge on the basis of the known charge equivalent area.

The transition from monolayer (n=4) to higher d values (n=5) restricted the upper limit of the layer charge to ≤0.65 p.f.u. and >0.56 p.f.u. At n=7, a superstructure reflection from bilayer/monolayer interstratification became visible for the first time, but the series is not rational (cv=1.58%). An ordered interstratification (cv=0.67%) was present for n=8. A densely packed n-octylammonium bilayer (n=8) corresponds to a layer charge of 0.80 p.f.u; a monolayer corresponds to 0.40 p.f.u. According to this model, the ordered interstratification corresponded to a layer charge of 0.60 p.f.u. Furthermore, for n=11 (0.62 p.f.u.), bilayers were present (17.7 Å). For n=12 (0.58 p.f.u), a shift in the reflection was observed. Accordingly, the experimentally determined layer charge of (A1) was in the range of 0.65 p.f.u. and 0.62 p.f.u.

Figure 3:
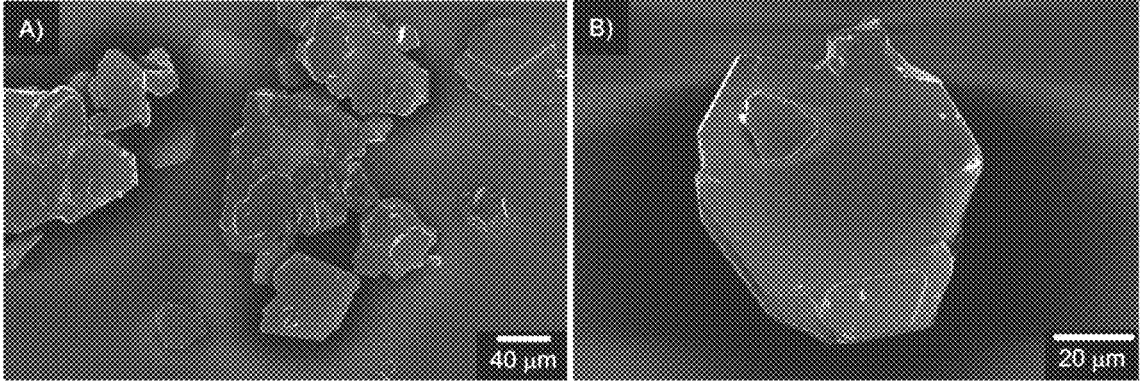
FIG. 3 includes depictions of SEM micrographs showing a lateral size extent of sheet silicates according to embodiments disclosed herein.

SLS measurement of the 2:1 sheet silicate (A1) shows that the 2:1 sheet silicate (A1) had a lateral size extent of around 10 to 20 μm diameter as the median. The platelet crystal habit of tactoids of high lateral extent in the region of around 10 to 150 μm is apparent in FIGS. 3A and 3B on the basis of SEM micrographs.

Synthesis of a 2:1 Sheet Silicate (IS1) Having Ordered Interstratification

For the synthesis of a 2:1 sheet silicate (IS1) having an ordered interstratification, a partial exchange of the interlayer cations of the 2:1 sheet silicate (A1) was carried out by treatment with a solvent mixture of water and ethanol (v:v, 1:1) containing n-butylammonium formate. In order to achieve, the equilibrium distribution dictated substantially with the solvent, but unknown, a 50:50 occupancy (=probability) of the two different interlayers, different proportions of the CEC were added.

The general protocol was as follows: 10 to 35 mg of the 2:1 sheet silicate (A1) were weighed out into centrifuge tubes (sealed with a septum) and swollen in 2 mL of ethanol/water (v:v, 1:1) for 12 hours. Then n-butylammonium formate (0.05 M) was added. Before the further addition of ethanol and water, it was ensured that the concentration of the n-butylammonium formate after its addition was 3.5 mmol/L. The resulting suspension was agitated in an overhead shaker at 23° C. for 24 hours. This was followed by washing three times with a mixture of ethanol/water (v:v, 1:1) and once with ethanol.

To prepare texture samples for the measurement of powder diffractograms, the product in suspension with ethanol was applied dropwise to a glass slide. The solvent was removed by evaporation at 23° C. (room temperature). The glass slide with the product was then baked at 60° C. for 12 hours and equilibrated at 43% relative humidity for 24 hours.

Figure 4:
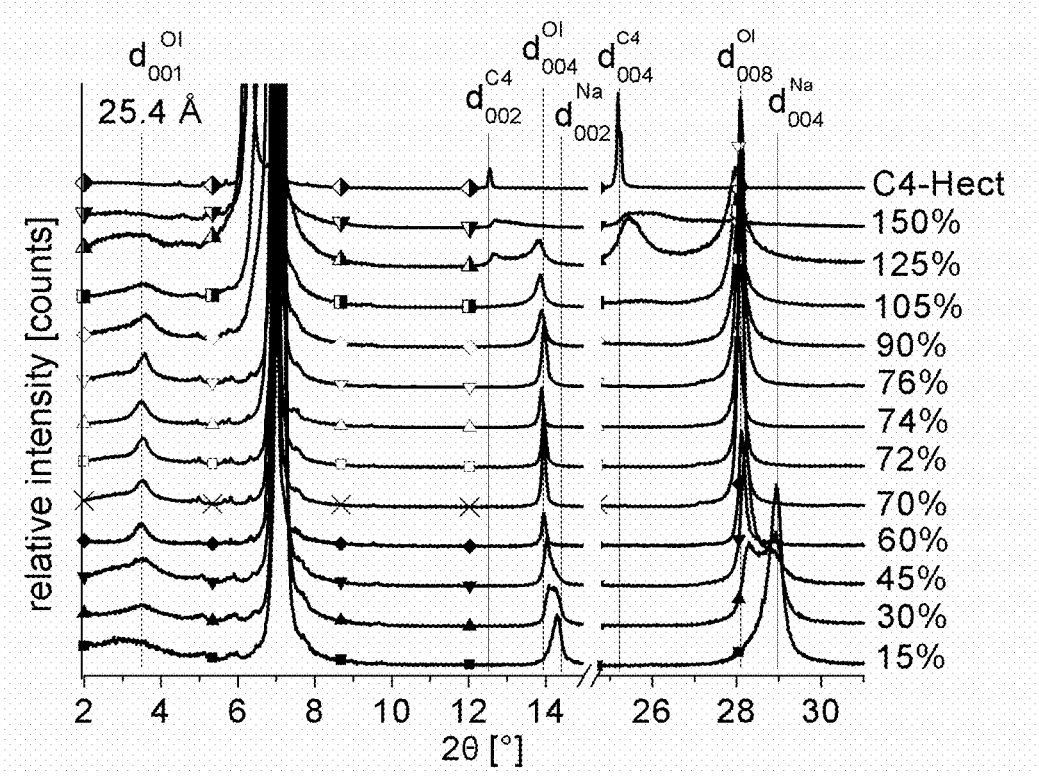
FIG. 4 is an x-ray diffractogram indicating d values of an interstratified sheet silicate according to embodiments disclosed herein.

The swelling of (A1) in the ethanol/water (v:v, 1:1) solvent mixture corresponds to the crystalline structure of (A1) with two water layers, having a very low full width at half-maximum of the 001 reflection of 0.06°. In the corresponding solvent mixture, different proportions of the CEC of n-butylammonium were added (15 to 200%). In this case the concentration of the adsorbate was kept constant at 3.5 mmol/L. The resulting products were characterized by x-ray; see FIG. 4. The recordings were made after swelling at 43% relative humidity. The plot is of the $d_{001}$ reflection of the interstratified 2:1 sheet silicate (AL1) at 25.4 Å (12.3 Å, 1 water layer Na and 13.1 Å, 0 water layers C4). Also indicated are the 004 and 008 reflections of this phase. Likewise marked are the 002 and 004 reflections of the sodium form and of the pure n-butylammonium form. On addition of 15% of the CEC, a slight shift in the sodium reflection was observed, which indicates an interstratification. The superstructure reflection of the interstratification is initially broad and has a low intensity, which is indicative through deviations of range 1 and/or statistical distribution of the alternating layers. The intensity of this reflection increased with the amount of n-butylammonium added. At the same time there was a shift in the further reflections in the direction of ordered interstratification. A rational series was first observed on addition of 60% of the CEC. The series remained rational up to an addition of 90% of the CEC, which emphasizes the broad stability range of the interstratified phase. For an addition of 105% of the CEC, the reflections shifted in the direction of a pure n-butylammonium form, which at 43% relative humidity had a d value of 14.0 Å. At 125% addition of the CEC, there were two phases. At an addition of 150% of the CEC, a strong shift in the d value was observed, which was assigned to the fully exchanged phases.

Figure 5:
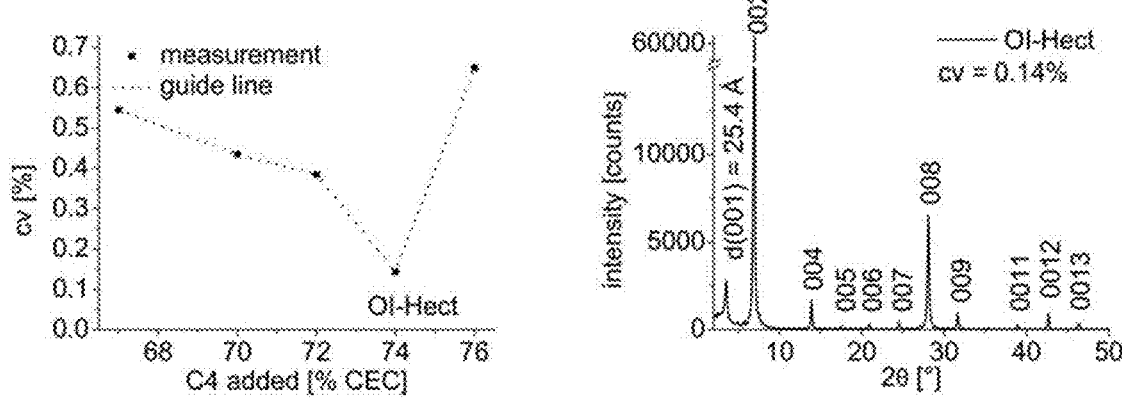
FIG. 5 includes a graphic depiction of the relationship between coefficient of variation and exchange capacity for an interstratified sheet silicate according to embodiments disclosed herein, and an x-ray diffractogram of an interstratified sheet silicate according to embodiments disclosed herein.

As is apparent from FIG. 5, the minimum in the coefficient of variation (cv=0.14%) was found for an addition of 74% of the exchange capacity.

Figure 6:
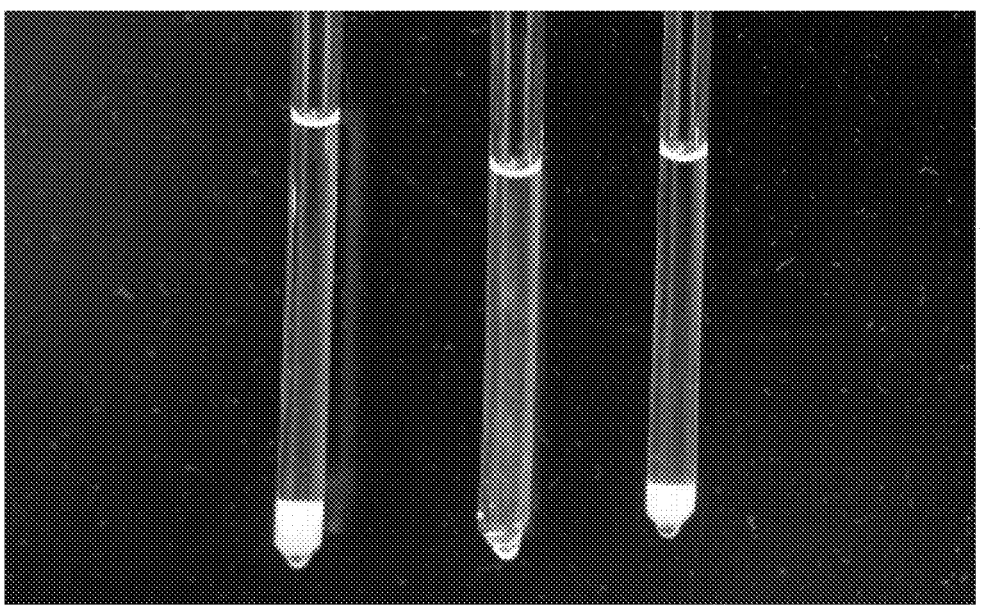
FIG. 6 is a depiction of dispersions of sheet silicates prepared with different solids contents according to embodiments disclosed herein.

To investigate the delamination of the 2:1 sheet silicate having ordered interstratification in water, dispersions were prepared with different solids contents. In this case, at high solids contents (15 wt %), a gel was formed, which even on dilution to 0.5 wt % formed a dispersion which was stable for several weeks. In this case, 'streaks' were formed. Similar behavior was not observed for the 2:1 sheet silicate (A1) and for the 2:1 sheet silicate completely exchanged with n-butylammonium cations; FIG. 6. These 2:1 sheet silicates fell to the bottom of the vessel as solids within a few seconds after being introduced into water.

Quantitative information about the swelling behavior described for the 2:1 sheet silicate (AL1) having ordered interstratification was provided by way of small-angle x-ray scattering (SAXS). This showed the presence of a uniform swelling with equal distance between the individual silicate lamellae. For a 10 wt % sample, a widening of the interplanar spacing to 168 Å as a result of osmotic swelling was observed. The drop in the intensity with $q^{-2}$ in this range was typical of layered subjects. The minimum in the form factor oscillation at a scattering vector of $q=0.70$ Å$^{-1}$ ($d_{min}=9$ Å) showed the delamination into individual lamellae. As a characteristic of the a,b plane of the layers, the 02/11 band in the wide-angle range at a scattering vector of 1.38 Å is visible. The sharp fluctuation in the measurement points in this range was unavoidable, since the scattering of the sample here is similar in extent to that of the solvent.

Figure 7:
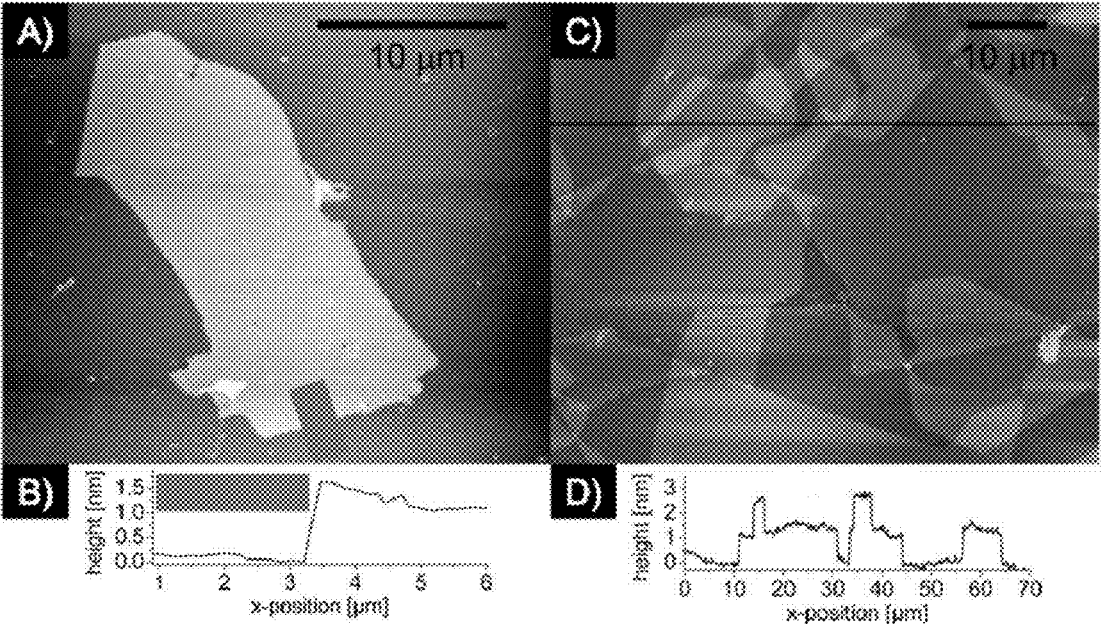
FIG. 7 includes micrographs of lamellae (A and C) according to embodiments disclosed herein and graphical depictions of height values of lamellae (B and D) according to embodiments disclosed herein.

Delamination into individual lamellae was further confirmed by AFM measurements. Because the thickness of a silicate lamella without the Helmholtz layer of the hydrated counterions is 9.6 Å (around 1 nm), all sheet silicate lamellae which in AFM micrographs are smaller than 2 nm could be assigned to individual lamellae. In view of the hydration of the ions below and above the lamellae, layer thicknesses>1 nm were expected. FIG. 7 shows typical micrographs of lamellae (A and C) and their height profile (B and D). Part A of the figures shows an exposed, individual silicate lamella. Part B shows an accumulation of several platelets which came to lie statistically above one another on drying.

There were discrete steps of 1.3 to 1.4 nm, and consequently these are delaminated, individual lamellae.

The invention claimed is:

1. Sheet silicate lamellae obtained by a method of delaminating a 2:1 sheet silicate, having ordered interstratification, in water, the method comprising:

preparing the 2:1 sheet silicate having an ordered interstratification by treating a 2:1 sheet silicate (A) with a solvent mixture comprising water, an alkylammonium salt, and a monoalcohol having 1 to 4 carbon atoms, wherein the 2:1 sheet silicate (A) has a Lagaly layer charge of 0.56 per formula unit to 0.90 per formula unit and the interlayers at least alternately have sodium cations, separating the 2:1 sheet silicate having an ordered interstratification from the solvent mixture, delaminating the 2:1 sheet silicate having an ordered interstratification by introducing the separated 2:1 sheet silicate having an ordered interstratification into water to produce an aqueous dispersion comprising sheet silicate lamellae, and separating the sheet silicate lamellae from the aqueous dispersion, wherein the sheet silicate lamellae have an average aspect ratio of at least 10,000.

2. The sheet silicate lamellae as claimed in claim 1, wherein the alkylammonium salt has 2 to 8 carbon atoms in the alkyl chain.

3. The sheet silicate lamellae as claimed in claim 1, wherein the concentration of the alkylammonium salt in the solvent mixture is 0.5 to 100.0 mmol/L.

4. The sheet silicate lamellae as claimed in claim 1, wherein the solvent mixture comprises ethanol.

5. The sheet silicate lamellae as claimed in claim 1, wherein the 2:1 sheet silicate (A) is a 2:1 sheet silicate prepared by melt synthesis.

6. The sheet silicate lamellae as claimed in claim 1, wherein the 2:1 sheet silicate (A) is a naturally occurring 2:1 sheet silicate or is prepared by treating a naturally occurring 2:1 sheet silicate with an aqueous solution of an alkali metal salt, wherein the alkali metal cation of the alkali metal salt is Na+.

7. The sheet silicate lamellae as claimed in claim 1, wherein the average aspect ratio has been determined using static light scattering (SLS) according to DIN 13320 (status: 2009).

8. An aqueous dispersion comprising the sheet silicate lamellae as claimed in claim 1 and water.

9. A composite material comprising the sheet silicate lamellae as claimed in claim 1 and at least one polymer.

10. The sheet silicate lamellae as claimed in claim 1, the aspect ratio being from 12,000-50,000.

* * * * *